(12) United States Patent
Ishihara et al.

(10) Patent No.: US 7,844,184 B2
(45) Date of Patent: Nov. 30, 2010

(54) REMOTE CONTROL RECEIVER AND ELECTRONIC EQUIPMENT INCLUDING THE SAME

(75) Inventors: Takehisa Ishihara, Kashihara (JP); Hideo Wada, Katsuragi (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 643 days.

(21) Appl. No.: 11/892,487

(22) Filed: Aug. 23, 2007

(65) Prior Publication Data

US 2008/0050128 A1 Feb. 28, 2008

(30) Foreign Application Priority Data

Aug. 24, 2006 (JP) ............................ P2006-227739

(51) Int. Cl.
  *H04B 10/06* (2006.01)
  *H04B 10/10* (2006.01)
(52) U.S. Cl. ..................... 398/131; 398/106; 398/120
(58) Field of Classification Search ................... 398/15, 398/120, 129, 131, 106
  See application file for complete search history.

(56) References Cited

U.S. PATENT DOCUMENTS

| | | | |
|---|---|---|---|
| 4,330,204 A | * | 5/1982 | Dye ...................... 356/139.05 |
| 5,030,004 A | * | 7/1991 | Grant et al. ................. 356/153 |
| 6,426,887 B2 | | 7/2002 | Nagai et al. | |

FOREIGN PATENT DOCUMENTS

| | | |
|---|---|---|
| JP | 59-21946 A | 2/1984 |
| JP | 9-51585 A | 2/1997 |
| JP | 09-053983 A | 2/1997 |
| JP | 11-145902 A | 5/1999 |
| JP | 2000-173325 A | 6/2000 |
| JP | 2002-026812 A | 1/2002 |

\* cited by examiner

*Primary Examiner*—Leslie Pascal
(74) *Attorney, Agent, or Firm*—Birch, Stewart, Kolasch & Birch, LLP

(57) ABSTRACT

At least a plurality of light-receiving regions for receiving remote control signals, respectively, in a form of incident light and performing photoelectric conversion of the signals are provided in one common mold package. The remote control receiver includes a first signal processing circuit for adding up signals outputted by the plurality of light-receiving regions and, based on a resulting signal, demodulating and outputting the remote control signal. The remote control receiver also includes a second signal processing circuit for calculating a difference between the signals outputted by the plurality of light-receiving regions to obtain and output a directional signal representing a direction in which the incident light has been incident on the plurality of light-receiving regions.

6 Claims, 12 Drawing Sheets

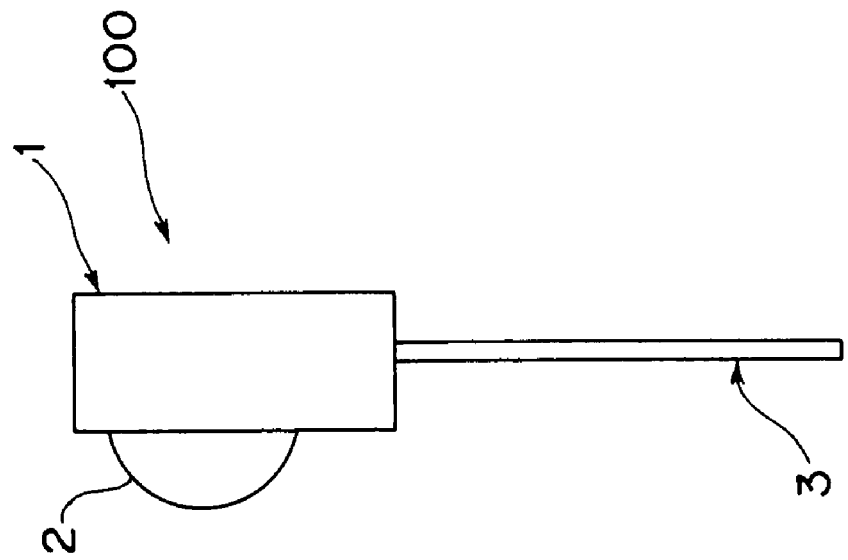
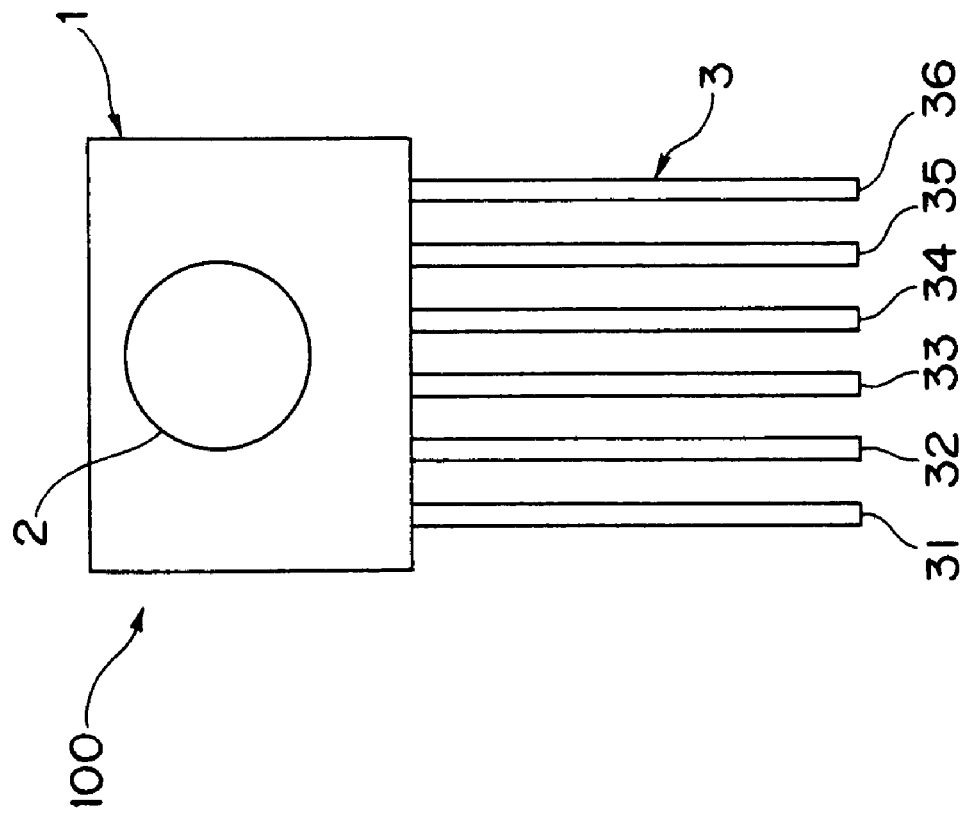

US 7,844,184 B2

REMOTE CONTROL RECEIVER AND ELECTRONIC EQUIPMENT INCLUDING THE SAME

CROSS-REFERENCE TO RELATED APPLICATIONS

This Nonprovisional application claims priority under 35 U.S.C. §119(a) on Patent Application No. 2006-227739 filed in Japan on Aug. 24, 2006, the entire contents of which are hereby incorporated by reference.

BACKGROUND OF THE INVENTION

The present invention relates to remote control receivers and, more particularly, to a remote control receiver capable of detecting a direction in which an operator of a remote control transmitter is present.

The invention also relates to an electronic equipment including such a remote control receiver.

As this type of remote control receiver, a conventionally known one is shown in FIG. 13A, in which a plurality of photodiodes 402A, 402B, 402C, 402D, 402E are provided on one PCB (Printed Circuit Board) 401 so as to be positioned in directions different from one another so that an incoming direction of light (i.e., a direction of an operator of the remote control transmitter) is detected based on magnitudes of outputs of the photodiodes 402A, 402B, 402C, 402D, 402E (see, e.g., JP 1993-145489 A). Various types of actuators are driven by a microcomputer in response to outputs of the photodiodes, respectively.

When the remote control receiver is incorporated, for example, in an electric fan, it becomes implementable to save time and labor for fine operations involved until a desired state such as an oscillating angle of the fan or a louver angle of an air conditioner is obtained by an air-direction switching key on a remote control transmitter, as has been the case hitherto, and to normally keep an object directed toward the remote control transmitter only by directly operating an air volume key or the like which is not directly related to the air direction.

The above-noted patent document discloses another example in which, as shown in FIG. 13B, a plurality of photodiodes 502A, 502B, 502C are positioned on one common PCB 501 for detection of a vertical direction.

SUMMARY OF THE INVENTION

However, in the remote control receivers described above, in which the individual photodiodes are assembled in independent mold packages, respectively, there is a problem that size reduction and price reduction are impaired.

Accordingly, an object of the present invention is to provide a remote control receiver which makes it possible to achieve size reduction and price reduction.

In order to solve the problem, a remote control receiver of the present invention comprises:

at least a plurality of light-receiving regions for receiving remote control signals, respectively, in a form of incident light and performing photoelectric conversion of the signals in one common mold package, the remote control receiver further comprises:

a first signal processing circuit for adding up signals outputted by the plurality of light-receiving regions and, based on resulting signals, demodulating and outputting the remote control signals; and a second signal processing circuit for calculating a difference between the signals outputted by the plurality of light-receiving regions to obtain and output a directional signal representing a direction in which the incident light has been incident on the plurality of light-receiving regions.

In the remote control receiver of this invention, the second signal processing circuit calculates a difference between the signals outputted by the plurality of light-receiving regions to obtain and output a directional signal representing a direction in which the incident light has been incident on the plurality of light-receiving regions. Therefore, depending on the directional signal, the direction in which the incident light has been incident with respect to the plurality of light-receiving regions is detected. Also, the first signal processing circuit adds up the signals outputted by the plurality of light-receiving regions and, based on a resulting signal, demodulates and outputs the remote control signal. Thus, the original remote control signal is obtained. In this case, since the first signal processing circuit adds up the signals outputted by the plurality of light-receiving regions, wastefulness in area of the light-receiving regions can be reduced so that the S/N ratio (signal-to-noise ratio) can be improved. Still, in this remote control receiver, since at least the plurality of light-receiving regions are housed in one common mold package, more size reduction and price reduction become achievable as compared with the prior art example.

Desirably, in addition to the plurality of light-receiving regions, first and second signal processing circuits are incorporated in the mold package. In this case, further size reduction and price reduction can be achieved.

The remote control receiver of one embodiment further comprises an external input terminal for turning on or off power supply to the second signal processing circuit so that the second signal processing circuit is powered only when the first signal processing circuit outputs the remote control signal.

In systems in which this type of remote control receiver is incorporated, there has been a possibility that the system may malfunction due to occurrence of a mis-recognition that an non-objective remote control signal (e.g., a remote control signal used for another system employed in the same room), when having been incident in the form of incident light, is mistaken as an objective remote control signal. In this connection, the remote control receiver of this one embodiment includes an external input terminal for turning on or off power supply to the second signal processing circuit. Therefore, for example, with the provision of an external circuit for receiving an output of the first signal processing circuit of the remote control receiver, the external circuit feeds the external input terminal a signal for turning on the power supply to the second signal processing circuit only when the first signal processing circuit outputs an objective remote control signal, while the external circuit feeds the external input terminal a signal for turning off the power supply to the second signal processing circuit when the first signal processing circuit outputs no objective remote control signal. Whether the signal is an "objective remote control signal" or not is discriminated depending on the format of the remote control signal as an example. In such a case, in this remote control receiver, even if an non-objective remote control signal has been incident in the form of incident light, the second signal processing circuit is not actuated, so that no directional signal is outputted. Therefore, even if any non-objective remote control signal has been incident in the form of incident light, the system does not malfunction. Thus, with the remote control receiver of this one embodiment, any malfunction of the system in which the remote control receiver is incorporated can be prevented.

The remote control receiver of one embodiment, further comprises an external input terminal for turning on or off an output path of the second signal processing circuit so that the second signal processing circuit outputs the directional signal only when the first signal processing circuit outputs the remote control signal.

In systems in which this type of remote control receiver is incorporated, there has been a possibility that the system may malfunction due to occurrence of a mis-recognition that an non-objective remote control signal (e.g., a remote control signal used for another system employed in the same room), when having been incident in the form of incident light, is mistaken as an objective remote control signal. In this connection, the remote control receiver of this one embodiment includes an external input terminal for turning on or off the output path of the second signal processing circuit. Therefore, for example, with the provision of an external circuit for receiving an output of the first signal processing circuit of the remote control receiver, the external circuit feeds the external input terminal a signal for turning on the output path of the second signal processing circuit only when the first signal processing circuit outputs an objective remote control signal, while the external circuit feeds the external input terminal a signal for turning off the output path of the second signal processing circuit when the first signal processing circuit outputs no objective remote control signal. Whether the signal is an "objective remote control signal" or not is discriminated depending on the format of the remote control signal as an example. In such a case, in this remote control receiver, even if an non-objective remote control signal has been incident in the form of incident light, the output path of the second signal processing circuit is turned off, so that no directional signal is outputted. Therefore, even if any non-objective remote control signal has been incident in the form of incident light, the system does not malfunction. Thus, with the remote control receiver of this one embodiment, any malfunction of the system in which the remote control receiver is incorporated can be prevented.

In the remote control receiver of one embodiment,
the plurality of light-receiving regions are two light-receiving regions included in a two-element PIN photodiode, and
the directional signal outputted by the second signal processing circuit is a signal of a uniaxial direction in which the incident light becomes incident.

Herein, the term "PIN photodiode" refers to a photodiode having a structure that an N-type semiconductor layer, an intrinsic semiconductor layer, and a P-type semiconductor layer are stacked one on another in this order.

In systems in which this type of remote control receiver is incorporated, there are some cases where only control of a uniaxial direction suffices for the control responsive to the direction in which the incident light becomes incident (i.e., a direction of the operator of the remote control transmitter). In this connection, in the remote control receiver of this one embodiment, the plurality of light-receiving regions are two light-receiving regions included in a two-element PIN photodiode, and the directional signal to be outputted by the second signal processing circuit is a signal of a uniaxial direction in which the incident light becomes incident. Therefore, the remote control receiver is suitable for a system for which only such control for a uniaxial direction suffices. That is, in the remote control receiver of this one embodiment, the separation zone (region insensitive to light) for electrically separating the light-receiving regions from each other needs only to be a smaller one. As a result, wastefulness in area of the surface of the semiconductor chip that include the two-element PIN photodiode can be reduced, allowing the S/N ratio (signal-to-noise ratio) to be most advantageous.

In another aspect, a remote control receiver of the present invention comprises, in one common mold package:
a PSD for, upon reception of a remote control signal on a light-receiving region in a form of incident light, outputting, from a first terminal and a second terminal provided at opposite ends of the light-receiving region with respect to at least one direction, first, second signals representing a position of the incident light within the light-receiving region;
a first signal processing circuit for adding up the first signal and the second signal and, based on resulting signals, demodulating and outputting the remote control signals; and
a second signal processing circuit for calculating a difference between the first signal and the second signal to obtain and output a directional signal representing a direction in which the incident light has been incident on the light-receiving region.

Herein, the term "PSD" (Position Sensitive Detector) refers to a device which includes a photodiode, a transparent resistive film stacked on the photodiode, and an electrode provided on peripheries of the transparent resistive film, and which outputs a signal responsive to a site of light incidence out of the light-receiving surface of the photodiode.

In the remote control receiver of this invention, since the PSD and the first and second signal processing circuits are housed in one common mold package, size reduction and price reduction become achievable.

In the remote control receiver of one embodiment,
the plurality of light-receiving regions are placed on a common flat surface,
the mold package includes one common lens which is forward convex shaped and which is located at a place corresponding to a front of the flat surface, and
given a distance S between an apex of the convex surface of the lens and the flat surface in a back-and-forth direction as well as a focal length f of the lens, a relation that $S<f$ is satisfied.

In the remote control receiver of this one embodiment, given a distance S between an apex of the convex surface of the lens and the flat surface in a back-and-forth direction as well as a focal length f of the lens, a relation that $S<f$ is satisfied. Therefore, the angular range over which incident light can be detected (the range referred to as "light-reception angle range") becomes broader, compared with the case where $S=f$. Thus, this remote control receiver is suitable for applications that demand broader light-reception angle ranges.

An electronic equipment of the present invention comprises:
one remote control receiver of the above invention; and
a control section for performing control in response to a content of the remote control signal outputted by the first signal processing circuit of the remote control receiver, and to a direction represented by the directional signal outputted by the second signal processing circuit of the remote control receiver.

In the electronic equipment of this invention, the control section performs control in response to a content of the remote control signal outputted by the first signal processing circuit of the remote control receiver, and to a direction represented by the directional signal outputted by the second signal processing circuit of the remote control receiver. The direction represented by the directional signal outputted by the second signal processing circuit of the remote control receiver is, actually, a relative direction in which the operator of the remote control transmitter is present and which is obtained by referencing positions of the plurality of light-receiving regions. Accordingly, the electronic equipment of this invention is preferably applied to such equipment as electric fans, air conditioners, fan heaters and halogen heaters in which the air direction is changed in response to the direction in which the operator of the remote control transmitter is present, or such video equipment as TV sets and flat display devices in which the direction of the screen is changed in response to the direction in which the operator is present.

In another aspect, an electronic equipment of the present invention comprises:

two remote control receivers of the above invention, spaced by a certain distance from each other;

a position calculation section for calculating a position of a remote control signal generation source with respect to the two remote control receivers based on the distance between the two remote control receivers and on directions represented by the directional signals outputted by the second signal processing circuits of the two remote control receivers, respectively; and a control section for performing control in response to the position of the remote control signal generation source with respect to the two remote control receivers calculated by the position calculation section, and to a content of the remote control signal outputted by the first signal processing circuit of any one of the remote control receivers.

In the electronic equipment of this invention, the position calculation section calculates a position of a remote control signal generation source with respect to the two remote control receivers based on the distance between the two remote control receivers and on directions represented by the directional signals outputted by the second signal processing circuits of the two remote control receivers, respectively. The control section performs control in response to the position of the remote control signal generation source with respect to the two remote control receivers calculated by the position calculation section, and to the content of the remote control signal outputted by the first signal processing circuit of any one of the remote control receivers. The position of a remote control signal generation source with respect to the two remote control receivers is, actually, a relative position in which the operator of the remote control transmitter is present and which is obtained by referencing the positions of the two remote control receivers. Therefore, the electronic equipment of this invention is preferably applied to audio equipment or other equipment in which the sound field is reproduced in response to the position where the operator of the remote control transmitter is present.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1A is a view showing an appearance of a remote control receiver which is an embodiment of the present invention, as viewed from the front;

FIG. 1B is a view of the remote control receiver of FIG. 1A, as viewed from the right side;

DETAILED DESCRIPTION OF THE INVENTION

Hereinbelow, the present invention will be described in detail by way of embodiments thereof illustrated in the accompanying drawings.

Figure 2B:
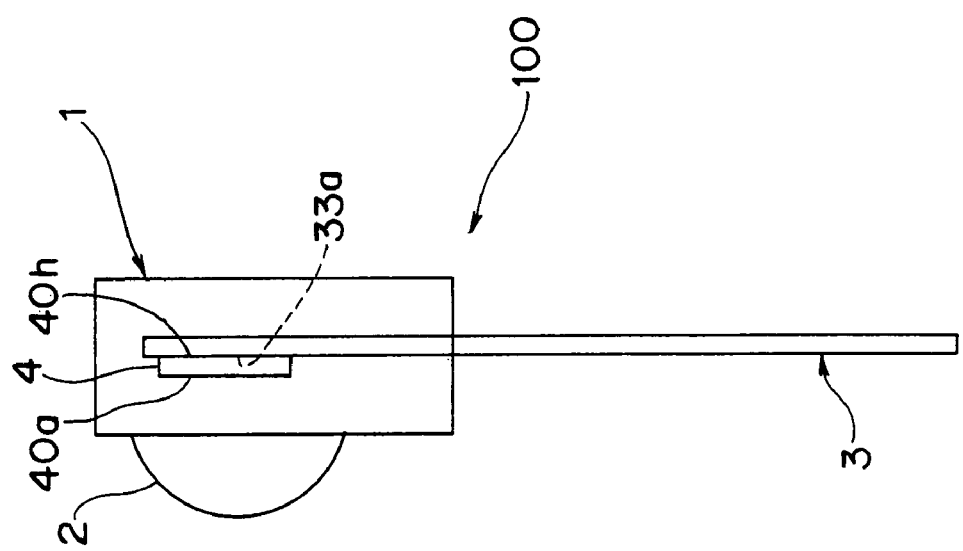
FIG. 2B is a view of the remote control receiver of FIG. 2A, as viewed from the right side.
Figure 2A:
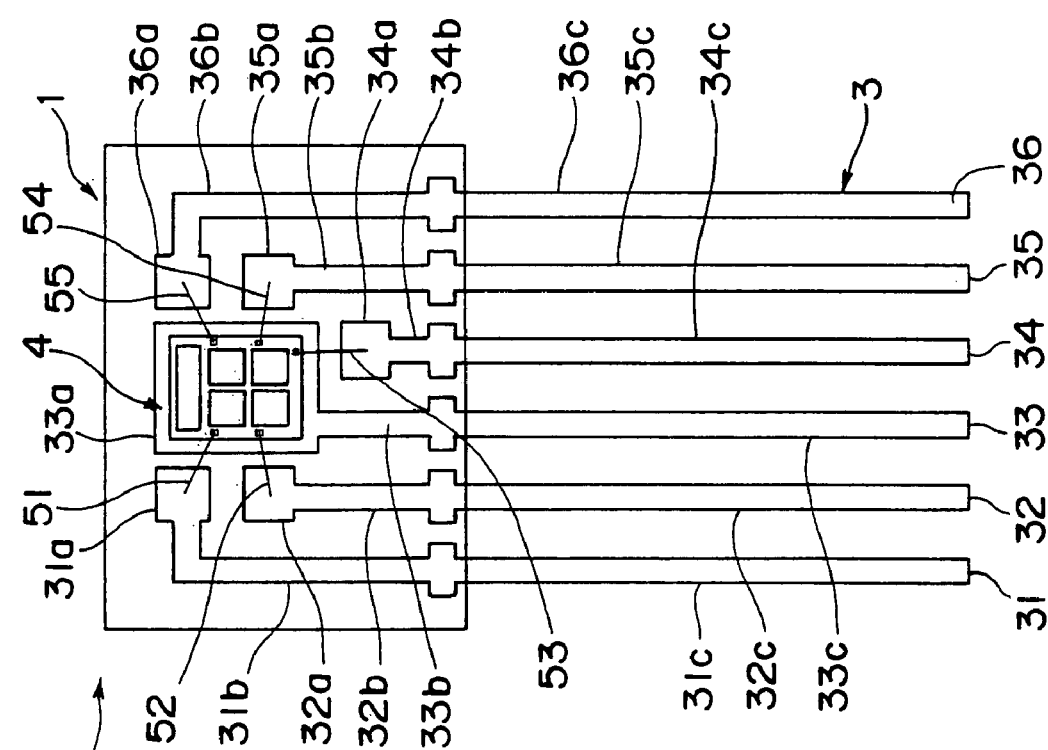
FIG. 2A is an inside view of the remote control receiver, as viewed from the front, with the mold package 1 imaginarily depicted as transparent.

FIG. 1A shows an appearance of a remote control receiver which is an embodiment of the invention and which is suitably incorporated into a TV (television) set. FIG. 1B shows the remote control receiver of FIG. 1A, as viewed from the right side. FIGS. 2A and 2B are views corresponding to FIGS. 1A and 1B, respectively, with a mold package 1 imaginarily depicted as transparent.

As well apparent from FIG. 2A, this remote control receiver has lead frames 31, 32, 33, 34, 35, 36 (which are generically represented by reference numeral 3). The lead frames 31, 32, 33, 34, 35, 36 include rectangular-shaped land portions 31a, 32a, 33a, 34a, 35a, 36a for wire bond or die bond, inner lead portions 31b, 32b, 33b, 34b, 35b, 36b, and outer lead portions 31c, 32c, 33c, 34c, 35c, 36c, respectively. A rectangular parallelopiped-shaped semiconductor chip 4 is die bonded to the land portion (header portion) 33a of the lead frame 33 with adhesive.

Figure 3:
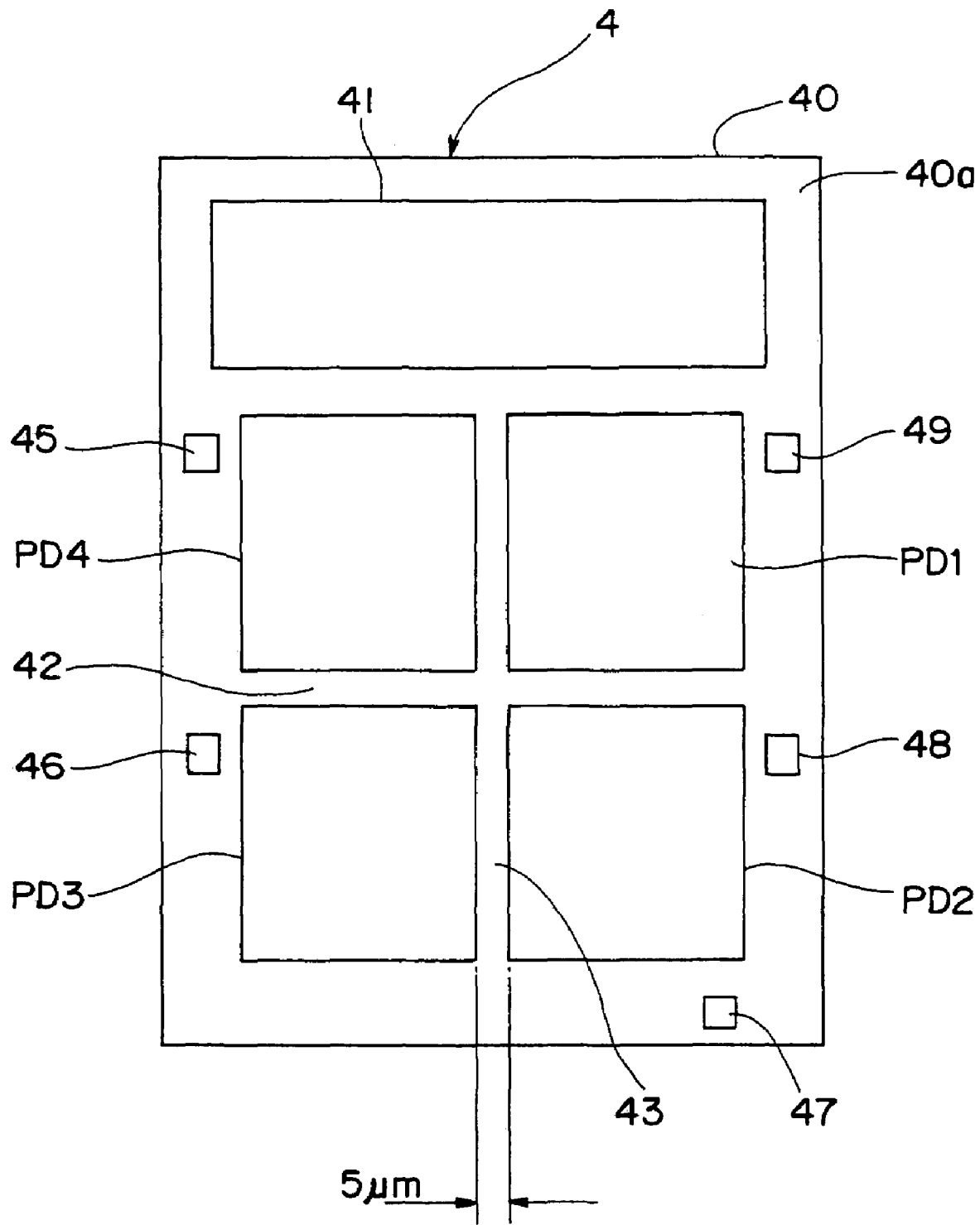
FIG. 3 is a view showing a pattern layout of a semiconductor chip with which the remote control receiver is made up.

The semiconductor chip 4, as shown in FIG. 3, include four light-receiving regions (each forming a PIN photodiode) PD1, PD2, PD3, PD4 arrayed in a two-by-two square matrix on a surface of a semiconductor substrate 40. Referring to FIG. 3, the light-receiving regions PD1, PD2, PD3 and PD4 are placed in upper-right, lower-right, lower-left and upper-left regions, respectively. The light-receiving regions PD1, PD2, PD3, PD4 are partitioned by separation zones 42, 43 that are insensitive to light from one another. The separation zones 42, 43, although depicted somewhat broader in FIG. 3 for an easier understanding, are, actually, each about 5 μm wide. Within a surface 40$a$ of the semiconductor substrate 40, a later-described arithmetic circuit 41 is formed above the light-receiving regions PD1, PD4 placed on the upper side (+Z side in FIG. 2A) out of the light-receiving regions PD1, PD2, PD3, PD4. Also, electrode pads 45, 46, 47, 48, 49 are placed around the two-by-two square matrix-shaped light-receiving regions. These electrode pads 45, 46, 47, 48, 49, as shown in FIG. 2A, are electrically connected to the land portions 31$a$, 32$a$, 34$a$, 35$a$, 36$a$ of the lead frames (lead pins) 31, 32, 34, 35, 36 by gold wires 51, 52, 53, 54, 55, respectively.

As well understood from FIG. 2B, these semiconductor chip 4, gold wires 51-55, land portions 31$a$-36$a$, and the inner lead portions 31$b$-36$b$ are sealed by the mold package 1 made from visible light-cutting epoxy resin. In appearance, only the outer lead portions 31$c$, 32$c$, 33$c$, 34$c$, 35$c$, 36$c$ are projecting from the mold package 1. The mold package 1, which is made from epoxy resin that transmits infrared rays but cuts visible light, looks black by the naked eye.

At a position corresponding to the light-receiving regions PD1-PD4 out of the front face of the mold package 1, a convex lens 2 projecting forward in a hemispherical state is formed similarly from epoxy resin. This convex lens 2 condenses incident light onto surfaces of the light-receiving regions PD1-PD4. When the direction of light incidence has been varied, positions of focal points on the light-receiving regions PD1-PD4 are determined according to the direction of the light incidence. Accordingly, there occur differences among outputs of the light-receiving regions PD1-PD4 in response to the direction of light incidence.

The lead pin 31, with a power supply voltage Vcc applied thereto from external, acts as a power supply terminal. The lead pin 32 is a terminal for outputting a later-described remote control signal RmOUT, and called remote control output terminal. The lead pin 33 is a terminal to be grounded, being called GND terminal. The lead pin 34 is a terminal for outputting a later-described γ-axis output, being called γ-axis output terminal. The lead pin 35 is a terminal for outputting a later-described β-axis output, being called β-axis output terminal. The lead pin 36 is a terminal for inputting a later-described directional output control signal, being called external input terminal 36.

Figure 4A:
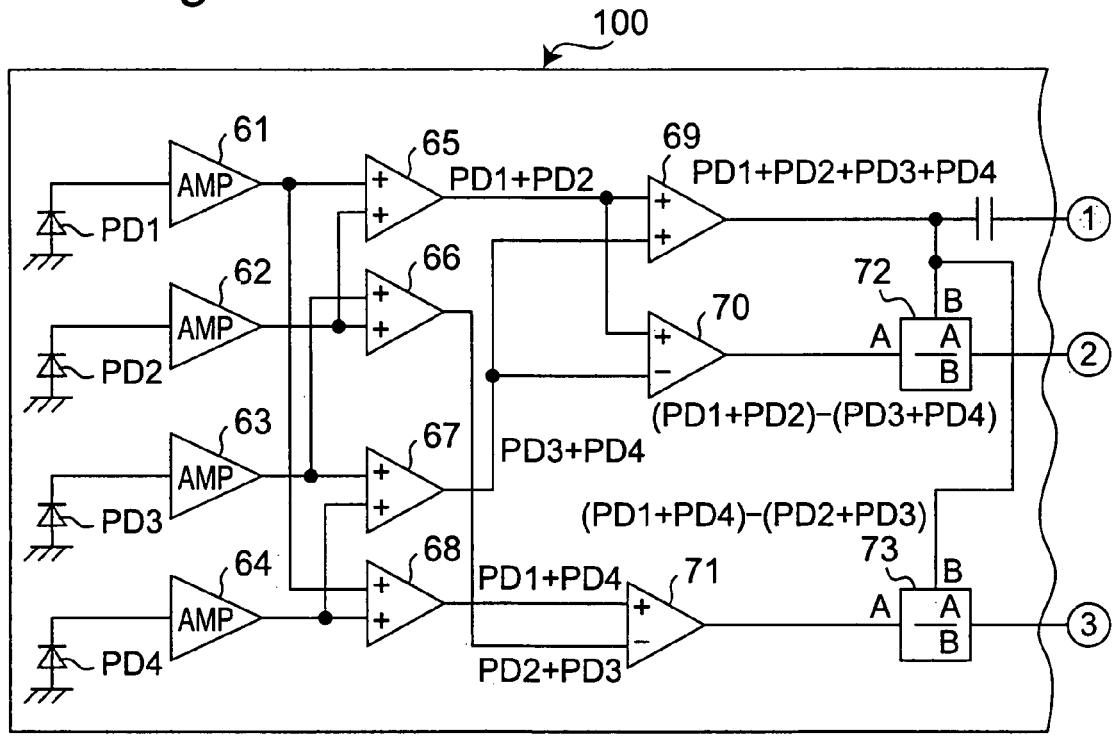
FIG. 4A is a view showing a block construction (left half) of the remote control receiver.
Figure 4B:
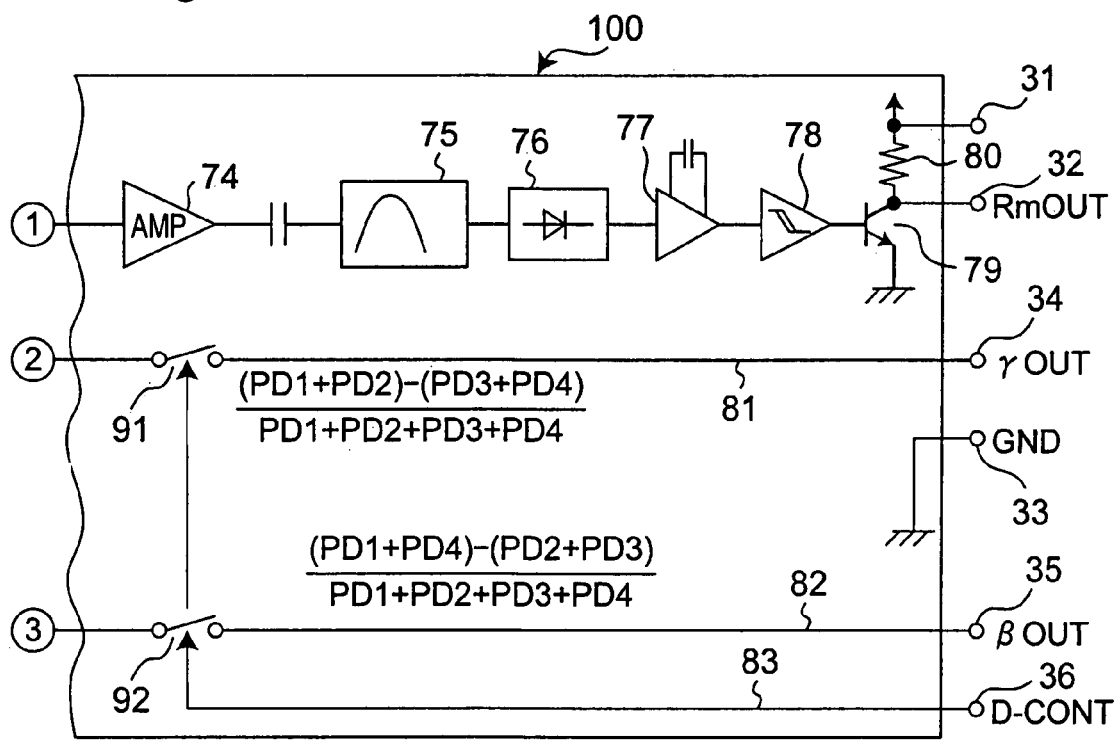
FIG. 4B is a view showing a block construction (right half) of the remote control receiver.

FIGS. 4A and 4B illustrates, by way of example, an overall block construction of the remote control receiver (denoted overall by reference numeral 100) of this embodiment, in which the arithmetic circuit 41 shown above is materialized. It is noted that terminals corresponding to each other in FIGS. 4A and 4B (denoted by encircled numerals 1, 2, 3) are connected to each other (the case is the same also with later-described FIGS. 5A and 5B, and FIGS. 7A and 7B, respectively).

In this example, the remote control receiver 100 includes photodiodes PD1, PD2, PD3, PD4 (represented by like reference numerals) corresponding to the light-receiving regions PD1, PD2, PD3, PD4, respectively, of FIG. 3, head amplifiers 61, 62, 63, 64 for amplifying outputs of those photodiodes, adders 65, 66, 67, 68, 69, subtracters 70, 71, and dividers 72, 73.

The adder 65 adds up outputs of the photodiodes PD1, PD2, the adder 66 adds up outputs of the photodiodes PD2, PD3, the adder 67 adds up outputs of the photodiodes PD3, PD4, and the adder 68 adds up outputs of the photodiodes PD3, PD4.

Further, the adder 69 adds up outputs of the adders 65, 67. That is, the adder 69 calculates a sum of signals outputted by the four photodiodes PD1, PD2, PD3, PD4 (the sum expressed as "PD1+PD2+PD3+PD4").

The subtracter 70 calculates a difference between an output of the adder 65 and an output of the adder 67 (the difference expressed as "(PD1+PD2)−(PD3+PD4)"). The subtracter 71 calculates a difference between an output of the adder 68 and an output of the adder 66 (the difference expressed as "(PD1+PD4)−(PD2+PD3)").

The divider 72 divides an output of the subtracter 70 by an output of the adder 69 to acquire a quotient {(PD1+PD2)−(PD3+PD4)}/(PD1+PD2+PD3+PD4). The divider 73 divides an output of the subtracter 71 by an output of the adder 66 to acquire a quotient {(PD1+PD4)−(PD2+PD3)}/(PD1+PD2+PD3+PD4). In FIG. 3, the photodiodes PD1, PD2 are placed on the right side, while the photodiode PD3, PD4 are placed on the left signal. Therefore, the output of the divider 72, {(PD1+PD2)−(PD3+PD4)}/(PD1+PD2+PD3+PD4), represents a direction in which incident light has been incident, with respect to the right-and-left direction (within the XY plane in FIG. 2A). Also in FIG. 3, the photodiodes PD1, PD4 are placed on the upper side, while the photodiodes PD2, PD3 are placed on the lower side. Accordingly, the output of the divider 73, {(PD1+PD4)−(PD2+PD3)}/(PD1+PD2+PD3+PD4), represents a direction in which incident light has been incident, with respect to the up-and-down direction (within the ZX plane in FIG. 2A).

The output of the adder 69 (PD1+PD2+PD3+PD4) is subjected to amplification by a succeeding-stage amplifier 74 shown in FIG. 4B, filtering by a band-pass filter (BPF) 75, detection by a detector 76, removal of minute fluctuations by a hysteresis comparator 78, amplification by an power amplifier composed of a load resistor 80 and an NPN transistor 79, and thus outputted as a remote control signal RmOUT to a remote control output terminal 32. In this way, since the remote control signal RmOUT is obtained by adding up the signals outputted by the four photodiodes PD1, PD2, PD3, PD4, wastefulness in area of the light-receiving regions can be reduced so that the S/N ratio (signal-to-noise ratio) can be improved.

The output of the divider 72, {(PD1+PD2)−(PD3+PD4)}/(PD1+PD2+PD3+PD4), is outputted as a γ-axis output (represented by a symbol "γout") to a γ-axis output terminal 34 through an output path 81 of an interconnect wire. The output of the divider 73, {(PD1+PD4)−(PD2+PD3)}/(PD1+PD2+PD3+PD4), is outputted as a β-axis output (represented by a symbol "βout") to a β-axis output terminal 35 through an output path 82 of an interconnect wire. The γ-axis output and the β-axis output are signals for instructing rotations around the Z axis and the Y axis, respectively, shown in FIG. 2A to an external circuit. That is, according to a direction in which incident light has been incident with respect to the right-and-left direction (within the XY plane), an instruction for rotation around the Z axis is given by the γ-axis output. According to a direction in which incident light has been incident with respect to the up-and-down direction (within the ZX plane), an instruction for rotation around the Y axis is given by the β-axis output.

Circuit elements 61-64, 65, 67, 69, 74-80 for outputting the remote control signal RmOUT to the remote control output terminal 32 constitute a "first signal processing circuit." This remote control signal RmOUT corresponds to a demodulation of an original remote control signal that has been incident on the photodiodes PD1, PD2, PD3, PD4 in the form of incident light.

Component elements 61-64, 65, 67, 70, 72 for outputting a γ-axis output γOUT to the γ-axis output terminal 34, as well as component elements 61-64, 66, 68, 71, 73 for outputting a β-axis output βOUT to the β-axis output terminal 35, constitute a "second signal processing circuit."

In this remote control receiver 100, since the photodiodes PD1, PD2, PD3, PD4 as well as the first and second signal processing circuits are housed in one common mold package, more size reduction and price reduction become achievable as compared with the prior art example.

In the case of this remote control receiver 100, the switches 91, 92 are interposed on the output path 81 for the γ-axis output γOUT and the output path 82 for the t-axis output βOUT, respectively. These switches 91, 92 are controlled by a directional output control signal (denoted by D-CONT) inputted from an external circuit to an external input terminal 36 to turn on or off the output paths 81, 82. In this example, the switches 91, 92 are normally open type ones.

Figure 11:
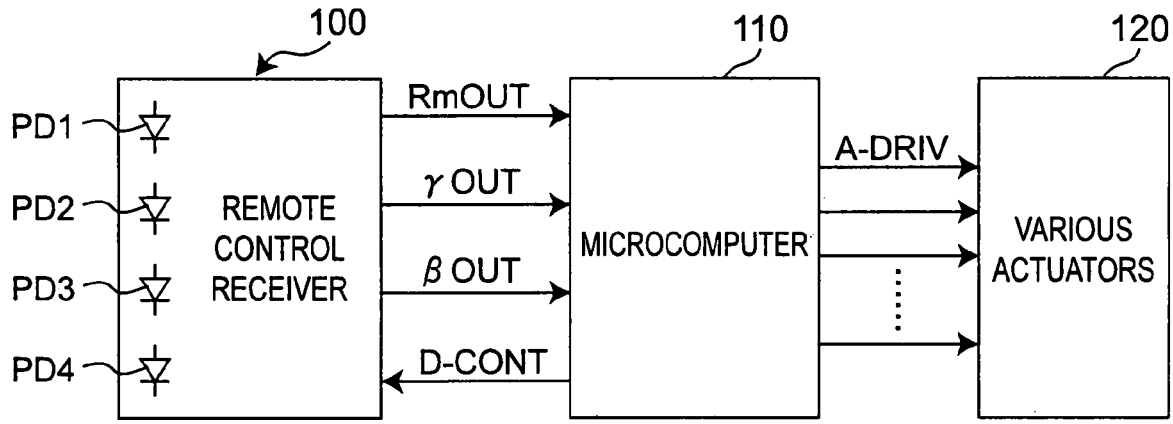
FIG. 11 is a view showing a block construction of electronic equipment in which the remote control receiver of FIG. 1 is incorporated.

FIG. 11 shows a block construction for controlling various actuators in a case where the above-described remote control receiver 100 is incorporated into a TV set as an example of electronic equipment.

It is assumed that the remote control receiver 100 is mounted to the front face of an unshown TV set in the same position as shown in FIG. 2A, as viewed from front.

A microcomputer 110 as an external circuit, basically, receives the remote control signal RmOUT, the γ-axis output and the β-axis output βOUT from the remote control receiver 100, and according to those signals, outputs a drive signal A-DRIV to drive various actuators 120.

In this example, only while the remote control receiver 100 is outputting an objective remote control signal RmOUT, the microcomputer 110 gives the directional output control signal D-CONT for turning on the switches 91, 92 to the external input terminal 36 of the remote control receiver 100. On the other hand, while the remote control receiver 100 is outputting no objective remote control signal RmOUT, the microcomputer 110 gives no signal to the external input terminal 36 of the remote control receiver 100. As a result, the normally open switches 91, 92 are turned off. Whether the signal is an "objective remote control signal" or not is discriminated depending on the format of the remote control signal as an example.

The system of FIG. 11, actually, operates as follows.

First, it is assumed that with an unshown remote control transmitter directed toward the remote control receiver 100, an operator has transmitted some remote control signal (e.g., a signal for instructing for turning on the power switch of a TV set) to a TV set in the form of incident light. The remote control receiver 100, receiving the incident light on the photodiodes PD1, PD2, PD3, PD4, outputs a remote control signal RmOUT in response to the incident light. The microcomputer 110, deciding that the remote control receiver 100 has outputted an objective remote control signal RmOUT, gives the external input terminal 36 of the remote control receiver 100 a signal D-CONT for turning on the switches 91, 92. Then, the remote control receiver 100 outputs a γ-axis output γOUT and β-axis output βOUT to the microcomputer 110. The microcomputer 110, receiving the γ-axis output γOUT and the t-axis output βOUT, outputs a drive signal A-DRIV based on those outputs to drive the various actuators 120. For example, a motor that serves for rotation around the Z axis is driven by the γ-axis output γOUT so that the display screen of the TV set is oscillated rightward and leftward, and a motor that serves for rotation around the Y axis is driven by the β-axis output βOUT so that the display screen of the TV set is oscillated up and down.

In such a case, with one-time operation on the remote control transmitter, the operator can turn on the power switch of the TV set, and direct the display screen of the TV set toward the operator himself/herself. As an example, when the operator has transmitted some remote control signal from a position of X=3 m, Y=3 m and Z=0 m to a TV set (more accurately, to the remote control receiver 100) by the remote control transmitter, the γ-axis output is 450 and the β-axis output βOUT is 0°, so that the display screen of the TV set is rotated 45° around the Z axis (γ axis).

Also, whether the signal is an "objective remote control signal" or not is discriminated by the microcomputer 110 according to the format of the remote control signal RmOUT. Therefore, even if an non-objective remote control signal has been incident in the form of incident light, the output paths 81, 82 of the second signal processing circuit are turned off, so that neither γ-axis output nor β-axis output is outputted. Thus, even if an non-objective remote control signal has been incident in the form of incident light, the system does not undergo any malfunction.

Figure 5A:
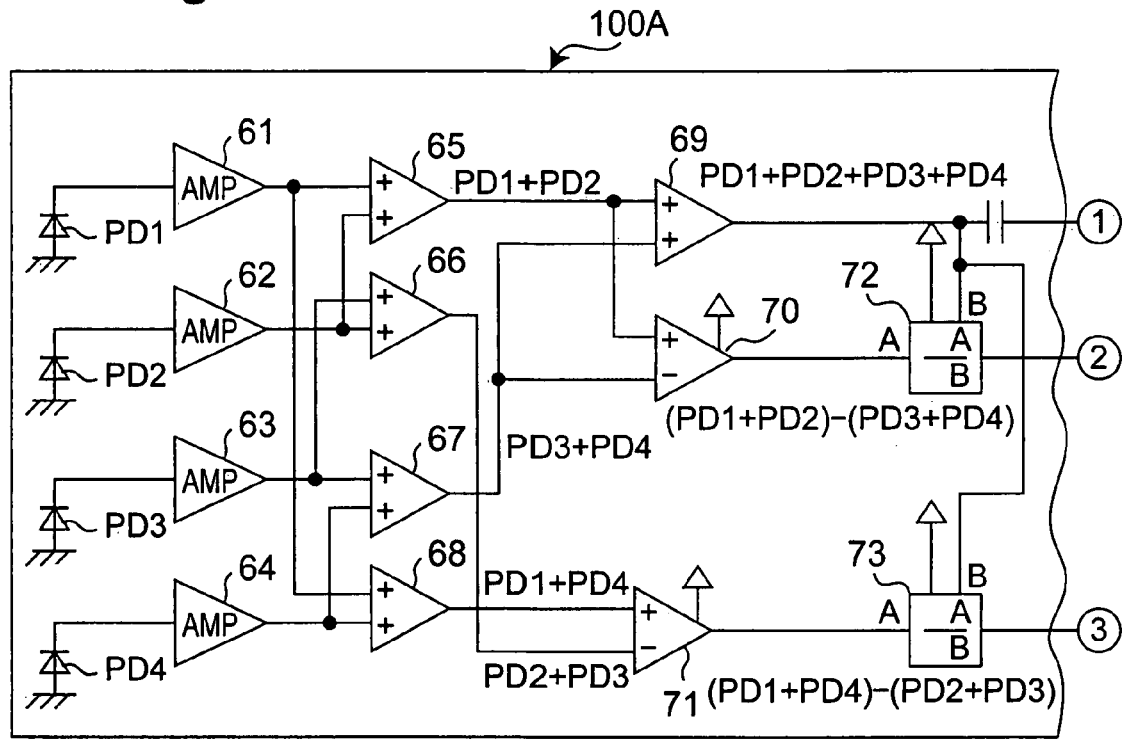
FIG. 5A is a view showing a block construction (left half) of a modification of the remote control receiver.
Figure 5B:
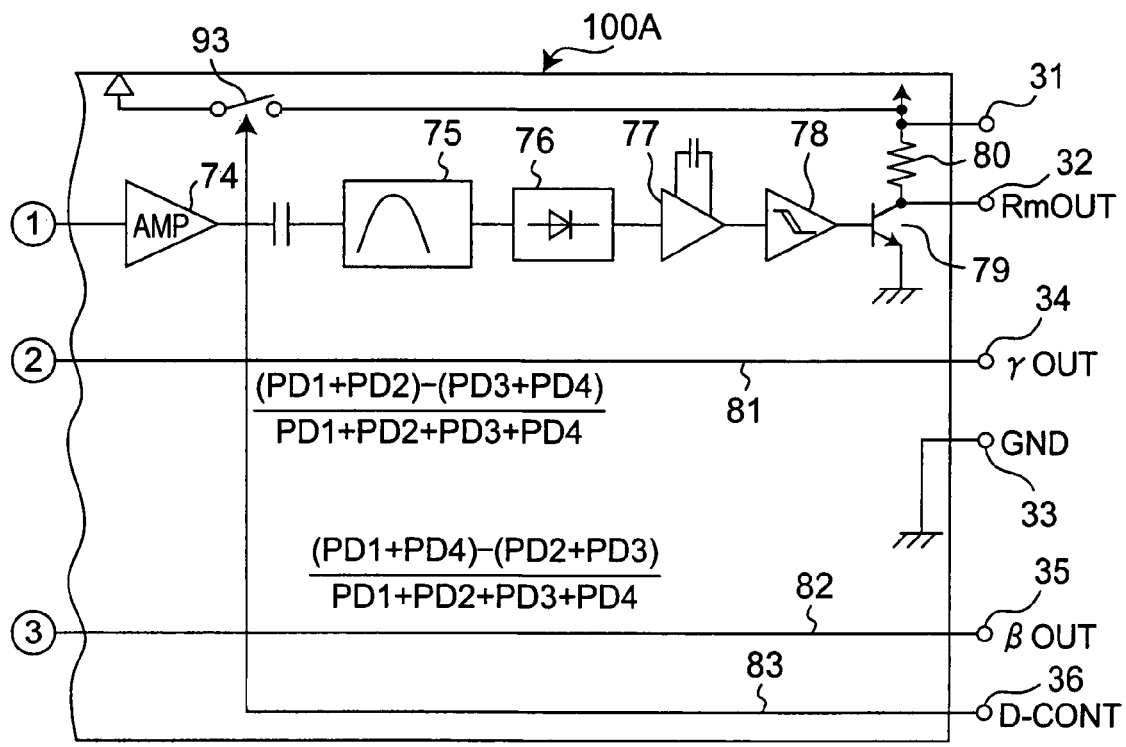
FIG. 5B is a view showing a block construction (right half) of the modification.

FIGS. 5A and 5B show a block construction of a modification (denoted overall by reference numeral 100A) of the remote control receiver 100. It is noted that symbol "A" in FIGS. 5A and 5B represents common power supplies, which are electrically connected to each other.

This remote control receiver 100A differs from that (remote control receiver 100) shown in FIGS. 4A and 4B only in that a directional output control signal D-CONT inputted from an external circuit to the external input terminal 36 serves not for turning on or off the output paths 81, 82 of the second signal processing circuit but for turning on or off power supply to the second signal processing circuit.

More specifically, in this remote control receiver 10A, a switch 93 is interposed on paths for supplying power from the power terminal 31 to the adders 66, 68, the subtracters 70, 71 and the dividers 72, 73 constituting second signal processing circuit. This switch 93 is controlled by the directional output control signal D-CONT inputted from the external circuit to the external input terminal 36 so that power supply to the adders 66, 68, the subtracters 70, 71 and the dividers 72, 73 constituting the second signal processing circuit is turned on or off. In this example, the switch 93 is a normally open type one.

This remote control receiver 10A, which is incorporated into such a TV set as shown in FIG. 11 as an example of electronic equipment, operates as the remote control receiver 100 does. That is, with one-time operation on the remote control transmitter, the operator can turn on the power switch of the TV set, and direct the display screen of the TV set toward the operator himself/herself.

Also, whether the signal is an "objective remote control signal" or not is discriminated by the microcomputer 110 according to the format of the remote control signal RmOUT. Therefore, even if an non-objective remote control signal has been incident in the form of incident light, the power supply for the second signal processing circuit is turned off, so that neither γ-axis output nor β-axis output is outputted. Thus, even if an non-objective remote control signal has been incident in the form of incident light, the system does not undergo any malfunction.

Figure 6:
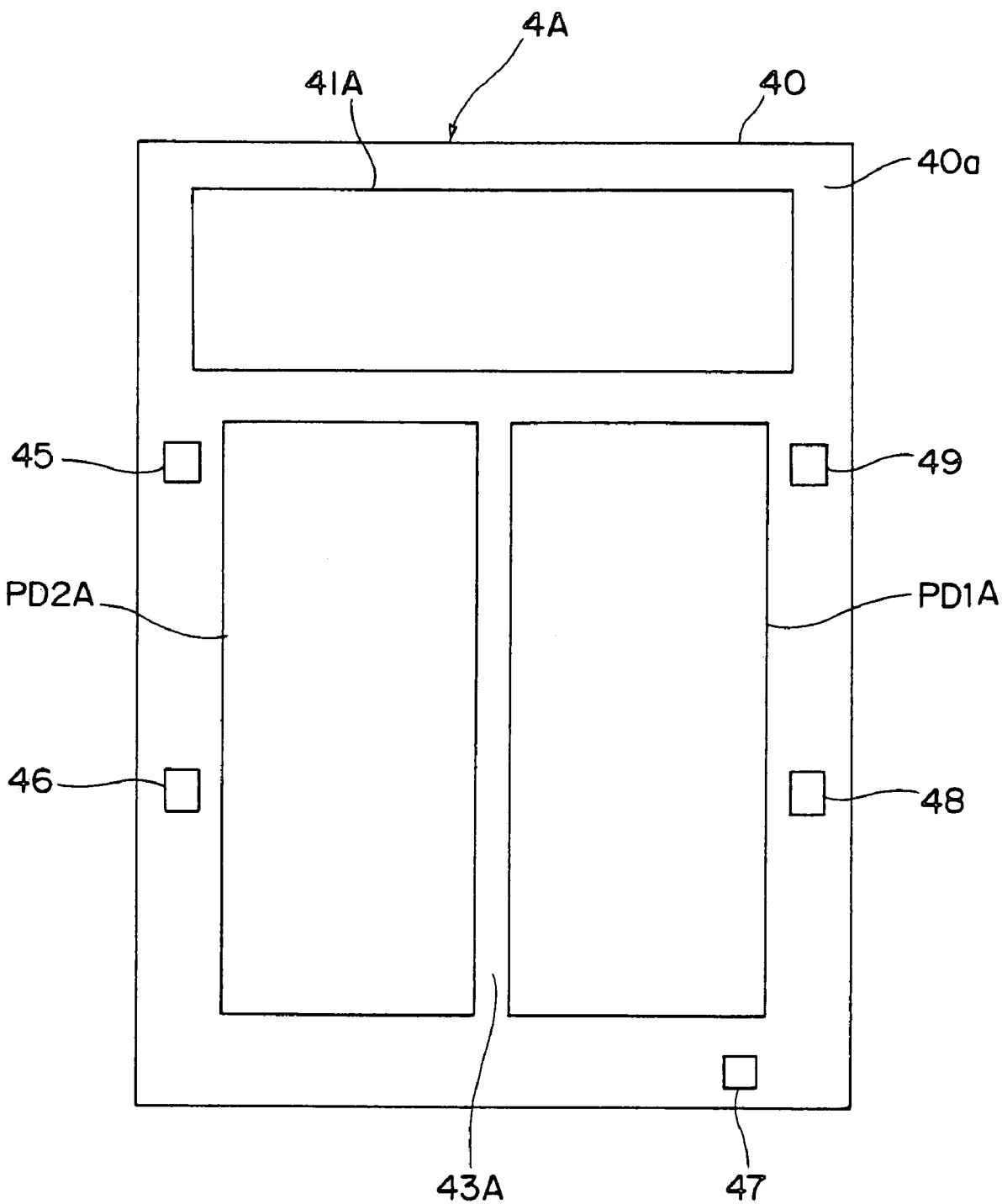
FIG. 6 is a view showing a pattern layout of a modification of the semiconductor chip of FIG. 3.

FIG. 6 shows a modification (denoted overall by reference numeral 4A) of the semiconductor chip 4.

For example, with the above-described system for the TV set, there are some cases where control of a uniaxial direction, i.e., control of the γ-axis output for right-and-left oscillation of the display screen of the TV set suffices for the control responsive to the direction in which incident light becomes incident (i.e., a direction of the operator of the remote control transmitter). Therefore, this semiconductor chip 4A, in contrast to that (semiconductor chip 4) shown in FIG. 3, includes not the four light-receiving regions PD1, PD2, PD3, PD4, but two light-receiving regions (each of which forms a PIN photodiode) PD1A, PD2A placed on the right and left sides in the surface 40a of the semiconductor substrate 40.

The light-receiving regions PD1A and PD2A are partitioned from each other by a separation zone 43A that is insensitive to light. The separation zone 43A, although depicted somewhat broader in FIG. 6 for an easier understanding, is, actually, about 5 μm wide. In such a case, the separation zone (region insensitive to light) for electrically separating the light-receiving regions from each other needs only to be a smaller one. As a result, wastefulness in area of the surface of the semiconductor chip 4A can be reduced, allowing the S/N ratio (signal-to-noise ratio) to be most advantageous.

Also, for an arithmetic circuit 41A, in contrast to that (arithmetic circuit 41) shown in FIGS. 4A and 4B, the component elements 66, 68, 71, 73 for outputting the β-axis output βOUT to the β-axis output terminal 35 can be omitted. Thus, more size reduction and price reduction become achievable.

Figure 8:
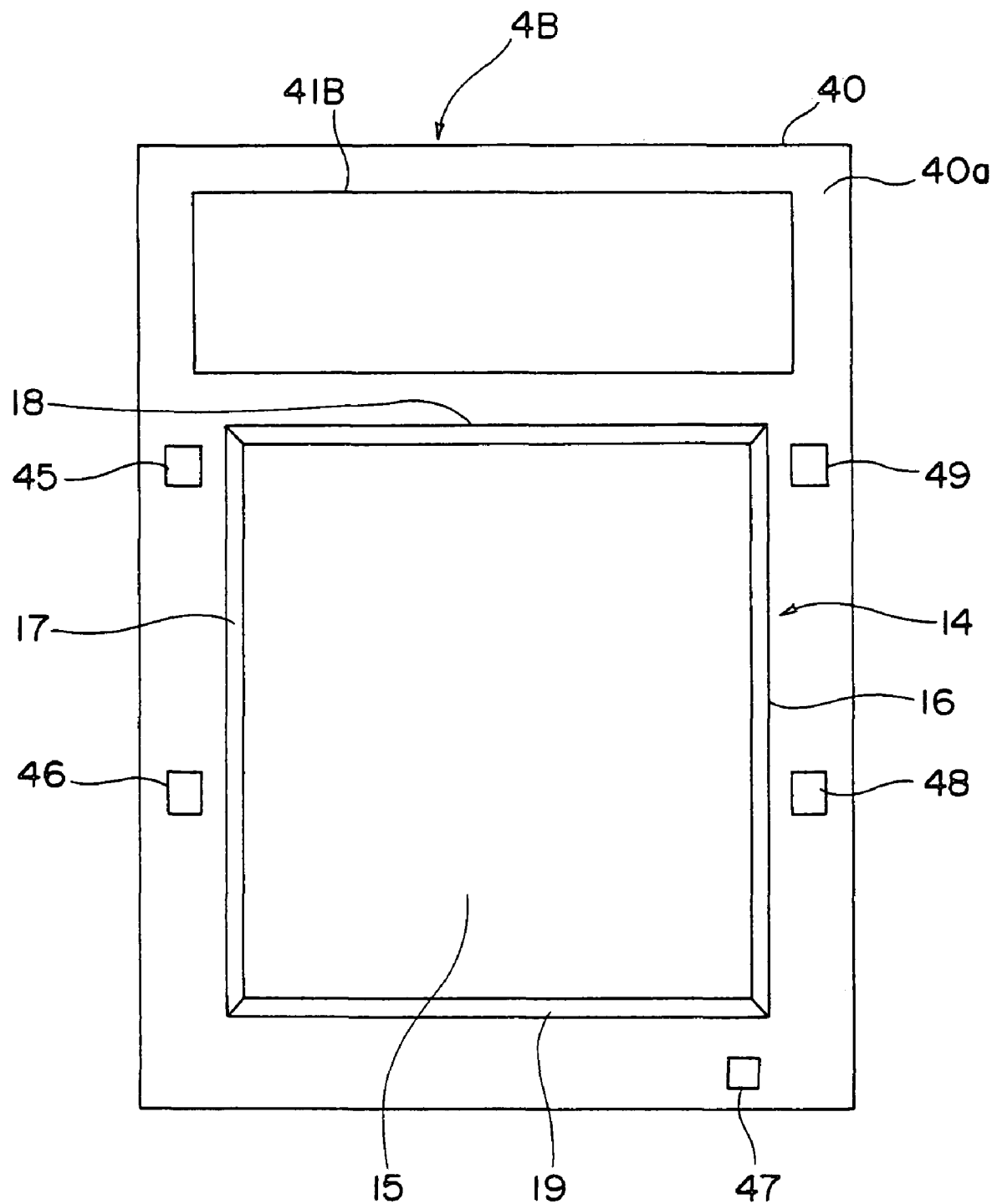
FIG. 8 is a view showing a pattern layout of a semiconductor chip with which the remote control receiver is made up.

FIG. 8 shows still another modification (denoted overall by reference numeral 4B) of the semiconductor chip 4.

This semiconductor chip 4B differs from the semiconductor chip 4 shown in FIG. 3 in that a PSD (Position Sensitive Detector) 14 is provided instead of the light-receiving regions given by PIN photodiodes.

This PSD 14 includes a photodiode 15, an unshown transparent resistive film 15 (denoted by the same numeral as that of the photodiode, for convenience,) stacked on the photodiode 15, and electrodes 16, 17, 18, 19 provided on peripheries of the transparent resistive film 15. A pair of electrode 16, 17, which are provided on both right and left ends of the transparent resistive film 15 in FIG. 8, output a signal representing a direction in which incident light has been incident with respect to the right-and-left direction (within the XY plane in FIG. 2A). A pair of electrodes 18, 19, which are provided on both upper and lower ends of the transparent resistive film 15 in FIG. 8, output a signal representing a direction in which incident light has been incident with respect to the upper-and-lower direction (within the ZX plane in FIG. 2A). An arithmetic circuit 41B for outputting the output of the PSD 14 is placed above the PSD 14.

Figure 7A:
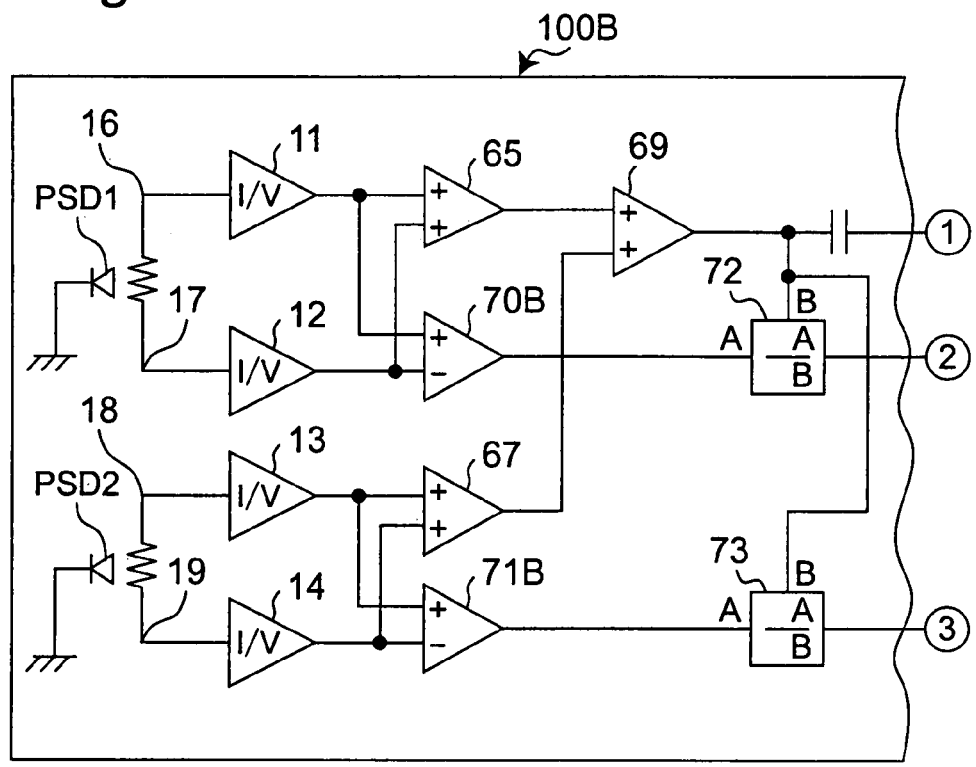
FIG. 7A is a view showing a block construction (left half) of a remote control receiver which is another embodiment of the invention.
Figure 7B:
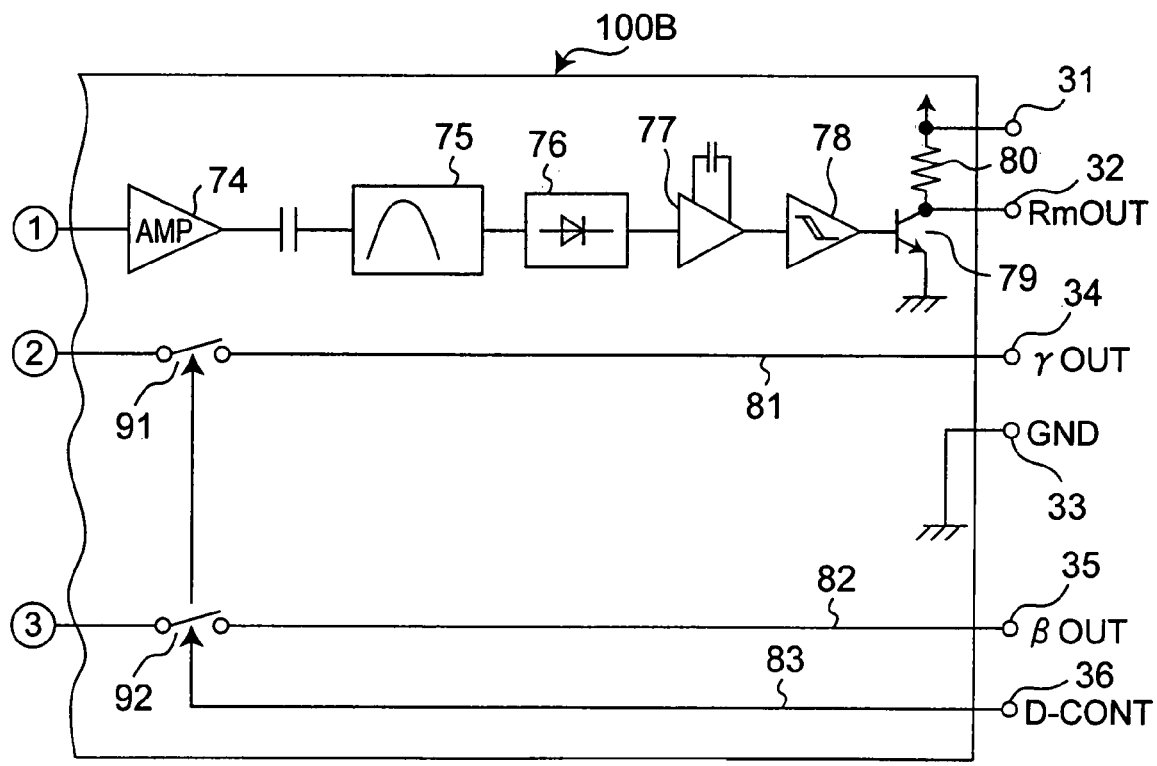
FIG. 7B is a view showing a block construction (right half) of the remote control receiver.

FIGS. 7A and 7B illustrate a block construction of a remote-control receiver (denoted overall by reference numeral 100B) according to an embodiment of the invention in which the above-described arithmetic circuit 41B is materialized.

In FIG. 7A, portions of the PSD 14 corresponding to the right-and-left pair of electrodes 16, 17 are denoted by reference character PSD1, and portions of the PSD 14 corresponding to the upper-and-lower pair of electrodes 18, 19 are denoted by reference character PSD2.

This remote control receiver 100B includes I/V converters 11, 12 by which currents outputted from the electrodes 16, 17 of the PSD1 are converted into voltages, respectively, and I/V converters 13, 14 by which currents outputted from the electrodes 18, 19 of the PSD2 are converted into voltages, respectively.

The adder 65 adds up outputs of the I/V converters 11, 12, a subtracter 70B calculates a difference between an output of the I/V converter 11 and an output of the I/V converter 12, the adder 67 adds up outputs of the I/V converters 13, 14, and a subtracter 71B calculates a difference between an output of the I/V converter 13 and an output of the I/V converter 14.

Functions of the adder 69, the dividers 72, 73 and the following component elements are similar to those of the component elements shown in FIGS. 4A and 4B. As a result, according to a direction in which incident light has been incident with respect to the right-and-left direction (within the XY plane), an instruction for rotation around the Z axis is given by the γ-axis output. According to a direction in which incident light has been incident with respect to the up-and-down direction (within the ZX plane), an instruction for rotation around the Y axis is given by the β-axis output βOUT.

Circuit elements 11-14, 65, 67, 69, 74-80 for outputting the remote control signal RmOUT to the remote control output terminal 32 constitute a "first signal processing circuit." This remote control signal RmOUT corresponds to a demodulation of an original remote control signal that has been incident on the photodiodes PD1, PD2, PD3, PD4 in the form of incident light.

Component elements 11, 12, 70B, 72 for outputting a γ-axis output γOUT to the γ-axis output terminal 34, as well as component elements 13, 14, 71B, 73 for outputting a t-axis output βOUT to the β-axis output terminal 35, constitute a "second signal processing circuit."

In this remote control receiver 100B, since the PSD 14, as well as the arithmetic circuit 41B as the first and second signal processing circuits are housed in one common mold package 1, size reduction and price reduction become achievable.

It is easy to incorporate this remote control receiver 100B, instead of the remote control receiver 100, into such a TV set as shown in the FIG. 11 as an example of electronic equipment.

Figure 9B:
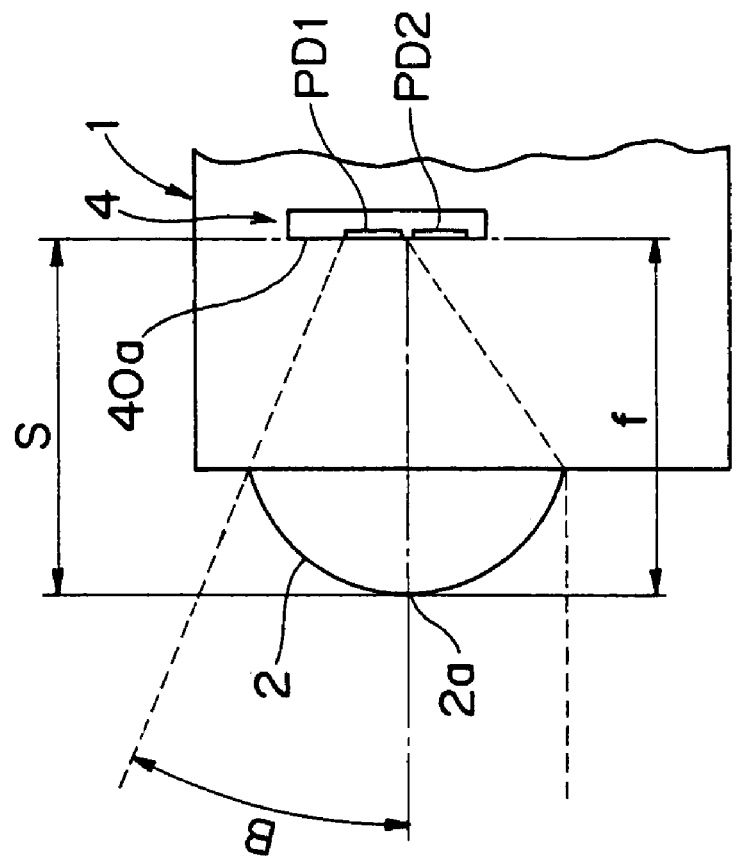
FIG. 9B is a view showing a light-reception angle range of a remote control receiver which is a reference example.
Figure 9A:
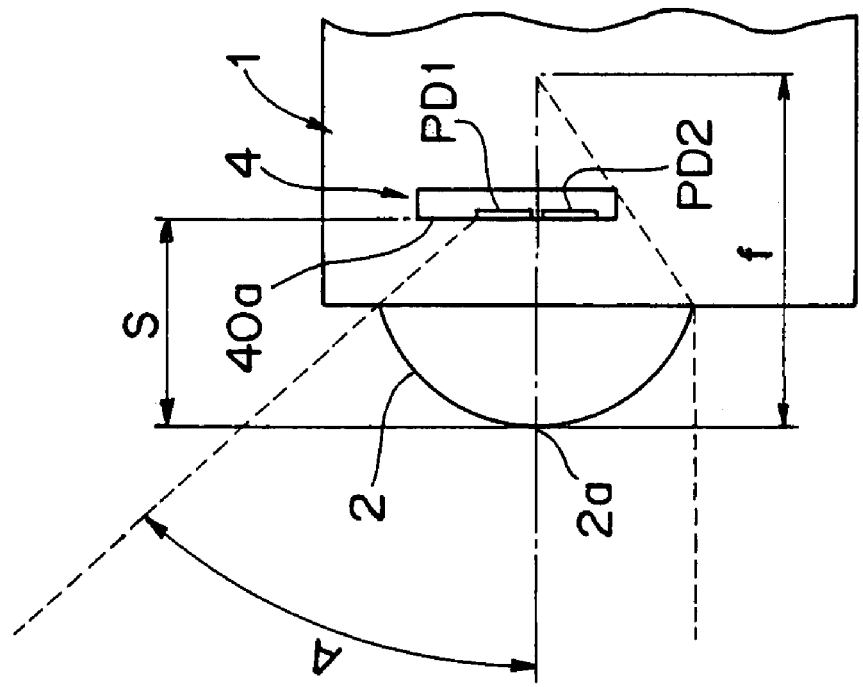
FIG. 9A is a view showing a light-reception angle range of the remote control receiver of FIG. 1.

FIG. 9A shows a positional relationship between the lens 2 and the semiconductor chip 4 in the already-described remote control receiver 100. In contrast to this, FIG. 9B shows a positional relationship between the lens 2 and the semiconductor chip 4 as a reference example. It is noted that reference numerals representing component elements of the reference example in FIG. 9B are the same as those representing their corresponding component elements in FIG. 9A, for an easier understanding.

Referring to FIGS. 9A and 9B, it is assumed that the focal length of the lens 2 is f and a distance in the back-and-forth direction (X direction in FIG. 2A) from an apex 2a of the convex surface of the lens 2 to the surface 40a of the semiconductor chip 4 is S. Given that S=f as in the reference example shown in FIG. 9B, the focused image becomes the smallest, but the angular range B over which incident light can be detected (the range referred to as "light-reception angle range") is narrow. In contrast to this, given that S<f as shown in FIG. 9A, a light-reception angle range A becomes wider as compared with the case where S=f.

In the already-described system in which the remote control receiver 100 is incorporated into a TV set, a light-reception angle range of ±30° normally suffices with respect to the γ-axis direction. However, for some systems, the light-reception angle range is desired to be wider, e.g., +45° or ±60°. For instance, for electric fans, a light-reception angle range of ±60° is required with respect to the γ-axis direction. In such a case, a structure in which S<f is advantageous.

Figure 10A:
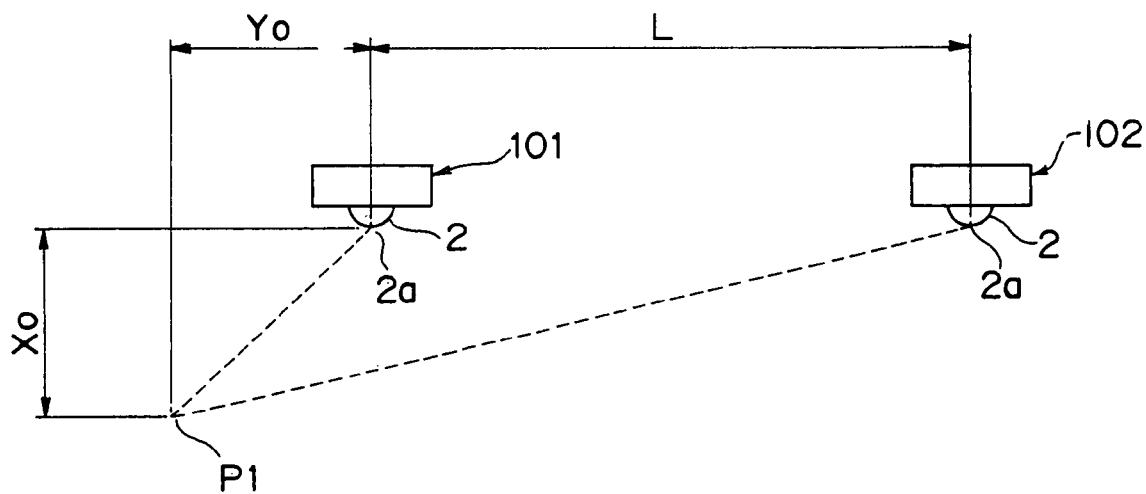
FIG. 10A is a view showing two remote control receivers spaced from each other by a certain distance, as viewed from above.
Figure 10B:
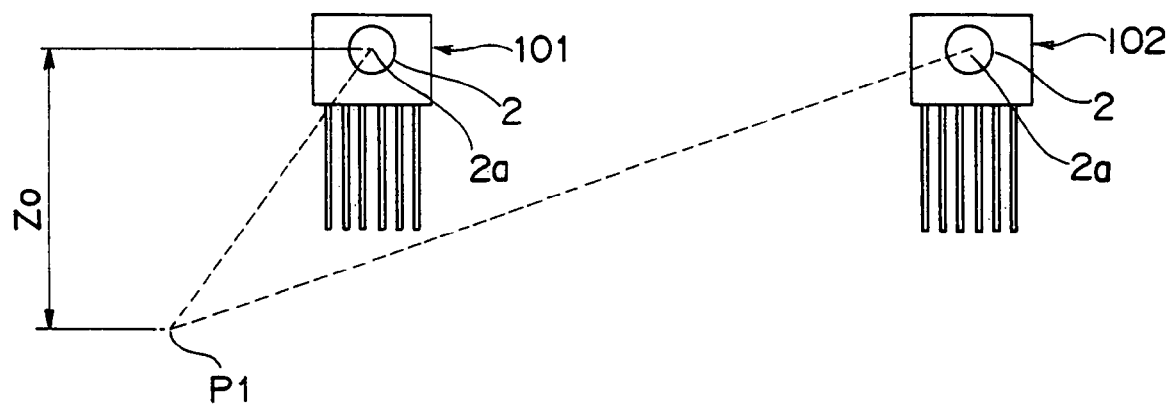
FIG. 10B is a view showing the remote control receivers of FIG. 10A, as viewed from the front.

FIGS. 10A and 10B show an example in which two of the already-described remote control receiver 100 (denoted by reference numerals 101, 102, respectively, for discrimination) are spaced at a distance L with respect to the right-and-left direction (Y direction in FIG. 2A). FIG. 10A corresponds to a view of them as viewed from above (+Z direction in FIG. 2A), and FIG. 10B corresponds to a view of them as viewed from the front (+X direction in FIG. 2A).

With such an arrangement that the two remote control receivers 101, 102 are placed with a spacing from each other, a position of a remote control signal transmission source (operator or remote control transmitter) P1 with respect to the two remote control receivers can be calculated based on directions (γ-axis output, β-axis output) of the remote control signal transmission source P1 detected by the remote control receivers 101, 102, respectively.

As shown in FIGS. 10A and 10B, it is assumed that the remote control signal transmission source P1 is so located as to be forward by Xo, leftward by Yo and downward by Zo with respect to the remote control receiver 101 located on the left side as viewed from the front. Also, it is assumed that the angle viewed for the re-mote control signal transmission source P1 from the remote control receiver 101 with respect to the γ axis and the β axis are γ1 and β1, respectively, and that the angle viewed for the remote control signal transmission source P1 from the remote control receiver 102 with respect to the γ axis and the β axis are γ2 and β2, respectively. In this case, the following relation (Equation 1) hold between Xo, Yo, Zo and γ1, β1, γ2, β2:

$$\gamma 1 = \text{Tan}^{-1}\left(\frac{Yo}{Xo}\right), \beta 1 = \text{Tan}^{-1}\left(\frac{Zo}{Xo}\right)$$
$$\gamma 2 = \text{Tan}^{-1}\left(\frac{Yo+L}{Xo}\right), \beta 2 = \text{Tan}^{-1}\left(\frac{Zo}{Xo}\right)$$

(Equation 1)

Therefore, Xo, Yo, Zo can be expressed as:

$$\left(\frac{Yo}{Xo}\right) = \text{Tan}\gamma 1, \left(\frac{Zo}{Xo}\right) = \text{Tan}\beta 1$$
$$\left(\frac{Yo+L}{Xo}\right) = \text{Tan}\gamma 2, \beta 1 = \beta 2$$

(Equation 2)

and can be determined by the following equation (Equation 3):

$$Xo = \frac{L}{\text{Tan}\gamma 2 - \text{Tan}\gamma 1},$$
$$Yo = \frac{L \times \text{Tan}\gamma 1}{\text{Tan}\gamma 2 - \text{Tan}\gamma 1},$$
$$Zo = \frac{L \times \text{Tan}\beta 1}{\text{Tan}\gamma 2 - \text{Tan}\gamma 1}$$

(Equation 3)

Figure 12:
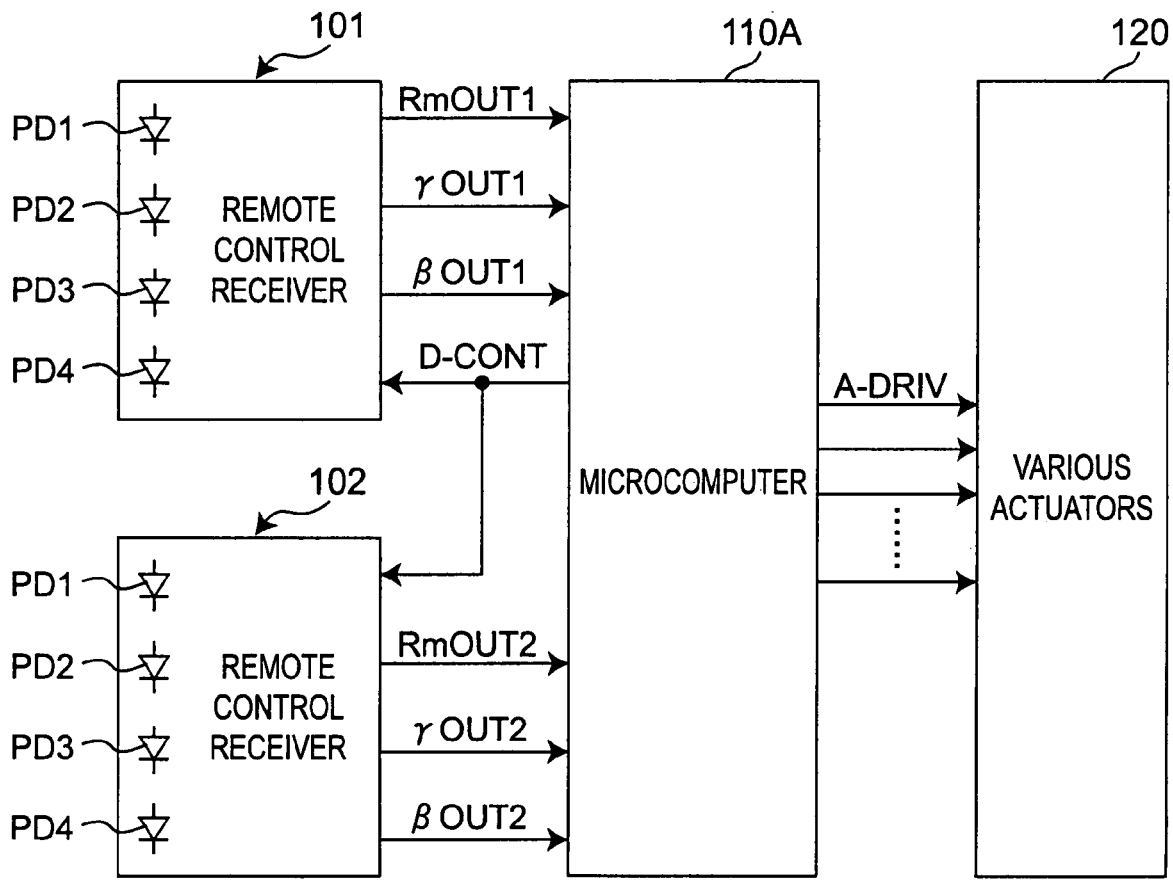
FIG. 12 is a view showing a block construction of electronic equipment in which two remote control receivers are incorporated.
Figure 13A:
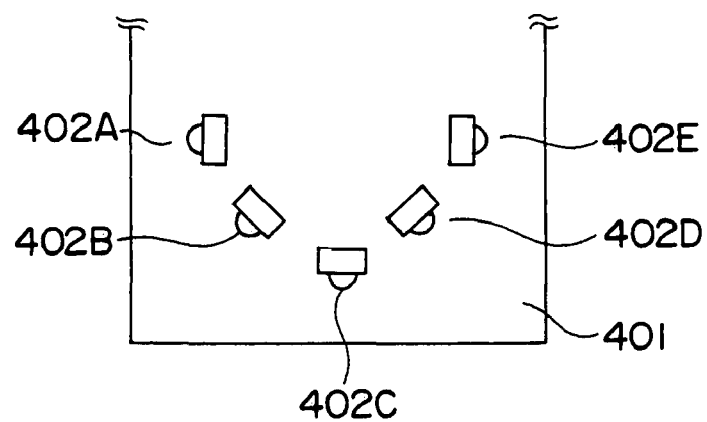
FIG. 13A is a view showing an arrangement of a plurality of photodiodes on one PCB in a remote control receiver which is a prior art example.
Figure 13B:
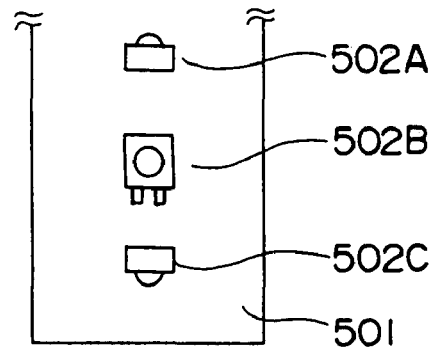
FIG. 13B is a view showing an arrangement of a plurality of photodiodes other than that of FIG. 13A.

FIG. 12 shows a block construction for controlling various actuators in a case where the above-described two remote control receivers 101, 102 are incorporated into audio equipment as an example of electronic equipment.

Referring to FIG. 12, remote control signals outputted by the two remote control receivers 101, 102 are expressed as RmOUT1, RmOUT2, respectively, γ-axis outputs outputted by the two remote control receivers 101, 102 are expressed as γOUT1, γOUT2, respectively, and β-axis outputs outputted by the two remote control receivers 101, 102 are expressed as βOUT1, βOUT2, respectively.

A microcomputer 110A, upon receiving either the remote control signal RmOUT1 or the remote control signal RmOUT2, outputs a directional output control signal D-CONT to each of the two remote control receivers 101, 102. Then, the microcomputer 110A, working as a position calculation section, performs an arithmetic operation of the above equation (Equation 3) by using the γ-axis outputs γOUT1, γOUT2 and the β-axis outputs OUT1, βOUT2 outputted by the two remote control receivers 101, 102 to calculate the position of the remote control signal transmission source P1.

Subsequently, the microcomputer 110A, working as a control section, outputs a drive signal A-DRIV based on the position of the remote control signal transmission source P1 and the remote control signals RmOUT1, RmOUT2 outputted by the remote control receivers 101, 102 to drive the various actuators 120. For instance, a sound field is reproduced in response to the position P1 where, for example, the operator of the remote control transmitter is present.

As shown above, the remote control receiver of the present invention can preferably be applied to various types of electronic equipment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A remote control receiver comprising:
at least a plurality of light-receiving regions for receiving remote control signals, respectively, in a form of incident light and performing photoelectric conversion of the signals in one common mold package, the remote control receiver further comprising:
a first signal processing circuit for adding up signals outputted by the plurality of light-receiving regions and, based on resulting signals, demodulating and outputting the remote control signals;
a second signal processing circuit for calculating a difference between the signals outputted by the plurality of light-receiving regions to obtain and output a directional signal representing a direction in which the incident light has been incident on the plurality of light-receiving regions; and
an external input terminal for turning on or off power supply to the second signal processing circuit so that the second signal processing circuit is powered only when the first signal processing circuit outputs the remote control signal.

2. An electronic equipment comprising:
one remote control receiver as defined in claim 1; and
a control section for performing control in response to a content of the remote control signal outputted by the first signal processing circuit of the remote control receiver, and to a direction represented by the directional signal outputted by the second signal processing circuit of the remote control receiver.

3. A remote control receiver comprising:
at least a plurality of light-receiving regions for receiving remote control signals, respectively, in a form of incident light and performing photoelectric conversion of the signals in one common mold package, the remote control receiver further comprising:

a first signal processing circuit for adding up signals outputted by the plurality of light-receiving regions and, based on resulting signals, demodulating and outputting the remote control signals;
a second signal processing circuit for calculating a difference between the signals outputted by the plurality of light-receiving regions to obtain and output a directional signal representing a direction in which the incident light has been incident on the plurality of light-receiving regions; and
an external input terminal for turning on or off an output path of the second signal processing circuit so that the second signal processing circuit outputs the directional signal only when the first signal processing circuit outputs the remote control signal.

4. A remote control receiver comprising:
at least a plurality of light-receiving regions for receiving remote control signals, respectively, in a form of incident light and performing photoelectric conversion of the signals in one common mold package, the remote control receiver further comprising:
a first signal processing circuit for adding up signals outputted by the plurality of light-receiving regions and, based on resulting signals, demodulating and outputting the remote control signals; and
a second signal processing circuit for calculating a difference between the signals outputted by the plurality of light-receiving regions to obtain and output a directional signal representing a direction in which the incident light has been incident on the plurality of light-receiving regions, wherein
the plurality of light-receiving regions are two light-receiving regions included in a two-element PIN photodiode, and
the directional signal outputted by the second signal processing circuit is a signal of a uniaxial direction in which the incident light becomes incident.

5. A remote control receiving comprising:
at least a plurality of light-receiving regions for receiving remote control signals, respectively, in a form of incident light and performing photoelectric conversion of the signals in one common mold package, the remote control receiver further comprising:
a first signal processing circuit for adding up signals outputted by the plurality of light-receiving regions and, based on resulting signals, demodulating and outputting the remote control signals; and
a second signal processing circuit for calculating a difference between the signals outputted by the plurality of light-receiving regions to obtain and output a directional signal representing a direction in which the incident light has been incident on the plurality of light-receiving regions, wherein
the plurality of light-receiving regions are placed on a common flat surface,
the mold package includes one common lens which is forward convex shaped and which is located at a place corresponding to a front of the flat surface, and
given a distance S between an apex of the convex surface of the lens and the flat surface in a back-and-forth direction as well as a focal length f of the lens, a relation that $S<f$ is satisfied.

6. An electronic equipment comprising:
two remote control receivers, spaced by a certain distance from each other; wherein
each of the remote control receiver comprises:
at least a plurality of light-receiving regions for receiving remote control signals, respectively, in a form of incident light and performing photoelectric conversion of the signals in one common mold package, the remote control receiver further comprising:
a first signal processing circuit for adding up signals outputted by the plurality of light-receiving regions and, based on resulting signals, demodulating and outputting the remote control signals; and
a second signal processing circuit for calculating a difference between the signals outputted by the plurality of light-receiving regions to obtain and output a directional signal representing a direction in which the incident light has been incident on the plurality of light-receiving regions,
the electronic equipment further comprising:
a position calculation section for calculating a position of a remote control signal generation source with respect to the two remote control receivers based on the distance between the two remote control receivers and on directions represented by the directional signals outputted by the second signal processing circuits of the two remote control receivers, respectively; and
a control section for performing control in response to the position of the remote control signal generation source with respect to the two remote control receivers calculated by the position calculation section, and to a content of the remote control signal outputted by the first signal processing circuit of any one of the remote control receivers.

* * * * *